United States Patent
Tu et al.

(10) Patent No.: US 9,141,500 B2
(45) Date of Patent: Sep. 22, 2015

(54) TEST BOARD, TEST SYSTEM AND TEST METHOD FOR A POWER OVER ETHERNET DEVICE

(71) Applicant: Wistron Corp., New Taipei (TW)

(72) Inventors: Chien-Ju Tu, New Taipei (TW);
Kun-Liang Lai, New Taipei (TW);
I-Ming Chen, New Taipei (TW)

(73) Assignee: WISTRON CORP., New Taipei (TW)

( * ) Notice: Subject to any disclaimer, the term of this patent is extended or adjusted under 35 U.S.C. 154(b) by 472 days.

(21) Appl. No.: 13/658,312

(22) Filed: Oct. 23, 2012

(65) Prior Publication Data
US 2013/0257448 A1    Oct. 3, 2013

(30) Foreign Application Priority Data

Mar. 30, 2012  (TW) ............................. 101111274 A

(51) Int. Cl.
*G01R 31/04*  (2006.01)
*G06F 11/24*  (2006.01)
*H04L 12/10*  (2006.01)

(52) U.S. Cl.
CPC ................. *G06F 11/24* (2013.01); *H04L 12/10* (2013.01)

(58) Field of Classification Search
CPC ........ G06F 11/24; G06F 11/124; H04L 12/10
See application file for complete search history.

(56) References Cited

U.S. PATENT DOCUMENTS

| | | | |
|---|---|---|---|
| 7,230,412 B2 | 6/2007 | Stineman, Jr. et al. | |
| 7,449,796 B2 | 11/2008 | Elkayam et al. | |
| 7,499,796 B2 * | 3/2009 | Listle et al. | 701/426 |
| 7,504,744 B2 | 3/2009 | Stanford | |
| 7,516,340 B2 | 4/2009 | Landry et al. | |
| 7,613,936 B2 | 11/2009 | Stineman, Jr. et al. | |
| 7,660,345 B2 | 2/2010 | Yu | |
| 7,706,392 B2 | 4/2010 | Ghoshal et al. | |
| 7,782,094 B2 | 8/2010 | Vorenkamp | |
| 7,845,984 B2 | 12/2010 | Schaffer et al. | |
| 7,856,561 B2 | 12/2010 | Stineman, Jr. et al. | |
| 7,863,871 B2 | 1/2011 | Vorenkamp et al. | |
| 7,873,057 B2 | 1/2011 | Robitaille et al. | |
| 7,936,546 B2 | 5/2011 | Vorenkamp et al. | |
| 7,973,567 B2 | 7/2011 | Vorenkamp | |
| 7,979,168 B2 | 7/2011 | Velez et al. | |
| 8,045,602 B2 | 10/2011 | Yu | |
| 8,693,152 B2 * | 4/2014 | Tuen et al. | 361/56 |
| 8,823,402 B2 * | 9/2014 | Vladan | 324/713 |
| 2007/0011547 A1 * | 1/2007 | Karam | 714/746 |
| 2007/0041387 A1 * | 2/2007 | Ghoshal et al. | 370/395.52 |

(Continued)

*Primary Examiner* — Jermele M Hollington
(74) *Attorney, Agent, or Firm* — McClure, Qualey & Rodack, LLP

(57) ABSTRACT

A test board system and method for a power over Ethernet device are disclosed. The test board includes a direct current (DC) power terminal connected to a DC power supply, and includes a network connector, a detection circuit and a classification circuit. The detection and classification circuits are coupled to the network connector and both receive a DC voltage derived from the DC power supply. During different time stages, the detection circuit provides different impedances between the DC power terminal and the network connector. A voltage variation at a test terminal coupled with the network connector shows whether a powered device is connected to the network connector. During a classification stage, the classification circuit provides an impedance device between the DC power terminal and the network connector to build a current path, and classifies the powered device based on a current flowing through the current path.

9 Claims, 6 Drawing Sheets

(56) References Cited

U.S. PATENT DOCUMENTS

| | | | |
|---|---|---|---|
| 2007/0103829 A1* | 5/2007 | Darshan et al. | 361/90 |
| 2007/0208961 A1* | 9/2007 | Ghoshal et al. | 713/300 |
| 2008/0150718 A1 | 6/2008 | Apfel | |
| 2008/0244284 A1* | 10/2008 | Karam et al. | 713/300 |
| 2013/0031383 A1* | 1/2013 | Tuen et al. | 713/300 |
| 2013/0127481 A1* | 5/2013 | Vladan | 324/713 |
| 2014/0372773 A1* | 12/2014 | Heath et al. | 713/300 |

* cited by examiner

TEST BOARD, TEST SYSTEM AND TEST METHOD FOR A POWER OVER ETHERNET DEVICE

CROSS REFERENCE TO RELATED APPLICATIONS

This application claims priority of Taiwan Patent Application No. 101111274, filed on Mar. 30, 2012, the entirety of which is incorporated by reference herein.

BACKGROUND OF THE INVENTION

1. Field of the Invention

The disclosure relates to a test board, test system and test method for a Power over Ethernet (PoE) device.

2. Description of the Related Art

Power over Ethernet (PoE) is a technique to convey power and data to a device through Ethernet twisted pair cables. Web phones, wireless base stations, web cams, hubs, computers or the like may be powered by PoE technology. A device powered by PoE is named a Powered Device (abbreviated to PD).

Low-cost and efficient test technology for a Powered Device (as known as PoE device) is called for.

BRIEF SUMMARY OF THE DISCLOSURE

Test board, test system and test method for a PoE device are disclosed.

A test board for a PoE device in accordance with an exemplary embodiment of the disclosure comprises a DC power input terminal, a network connector, a detection circuit and a classification circuit. The DC power input terminal is connected to a DC power supply. The detection circuit is coupled to the network connector and has a first power terminal receiving a first DC voltage originating from the DC power supply. During different time stages, the detection circuit provides different impedances between the first power terminal and the network connector. In this manner, a voltage variation at a test terminal which is coupled to the network connector shows whether the network connector is connected to a powered device. The classification circuit is coupled to the network connector and has a second power terminal receiving the first DC voltage. During a classification stage, the classification circuit builds a first current path between the second power terminal and the network connector. In this manner, a current flowing thorough the first current path shows a classified result of the powered device which is connected to the network connector.

A test board for a PoE device in accordance with another exemplary embodiment of the disclosure comprises a DC power input terminal, a network connector, a detection circuit and a classification circuit. The DC power input terminal is connected to a DC power supply. The detection circuit is controlled by a first control signal and a second control signal and has a first power terminal, a first output terminal, a first resistor and a second resistor. The first power terminal receives a first DC voltage originating from the DC power supply. The first output terminal is coupled to the network connector. When the first control signal is enabled, the first resistor couples the first power terminal to the first output terminal and thereby the first output terminal is at a first voltage level. The second resistor has a resistance different from that of the first resistor. When the second control signal is enabled, the second resistor couples the first power terminal to the first output terminal and thereby the first output terminal is at a second voltage level. A voltage difference between the first and second voltage levels shows whether the network connector is connected with a powered device. The classification circuit is controlled by a third control signal, and has a second power terminal, a second output terminal and a third resistor. The second power terminal receives the first DC voltage. The second output terminal is coupled to the network connector. When the third control signal is enabled, the third resistor couples the second power terminal to the second output terminal and thereby a first current flows through the third resistor. The first current shows a classified result of the powered device which is connected to the network connector.

In another exemplary embodiment, a test system for a PoE device is shown, which comprises the disclosed test board for a PoE device, a host controlling the test board, and a powered device connected to the network connector of the test board.

A test method for a PoE device in accordance with an exemplary embodiment of the disclosure comprises the following steps: providing a test board for a PoE device, wherein the test board has a first resistor, a second resistor and a third resistor and a DC power input terminal connected to a DC power supply, and a network connector for a connection to a powered device; during a first detection stage, using one end of the first resistor to receive a first DC voltage originating from the DC power supply and coupling the other end of the first resistor to the network connector to obtain a first voltage level at a test terminal, wherein the test terminal is coupled to the network connector; during a second detection stage, using one end of the second resistor to receive the first DC voltage and coupling the other end of the second resistor to the network connector to obtain a second voltage level at the test terminal; verifying a connection between the network connector and the powered device in accordance with a voltage difference between the first voltage level and the second voltage level; providing a classification stage after the connection between the network connector and the powered device is confirmed, wherein during the classification stage one end of the third resistor is coupled to receive the first DC voltage and the other end of the third resistor is coupled to the network connector, and thereby a first current flows through the third resistor; and obtaining a classified result of the powered device based on the first current.

A detailed description is given in the following embodiments with reference to the accompanying drawings.

BRIEF DESCRIPTION OF THE DRAWINGS

The present disclosure can be more fully understood by reading the subsequent detailed description and examples with references made to the accompanying drawings, wherein.

DETAILED DESCRIPTION OF THE DISCLOSURE

The following description shows several exemplary embodiments carrying out the disclosure. This description is made for the purpose of illustrating the general principles of the disclosure and should not be taken in a limiting sense. The scope of the disclosure is best determined by reference to the appended claims.

Figure 1:
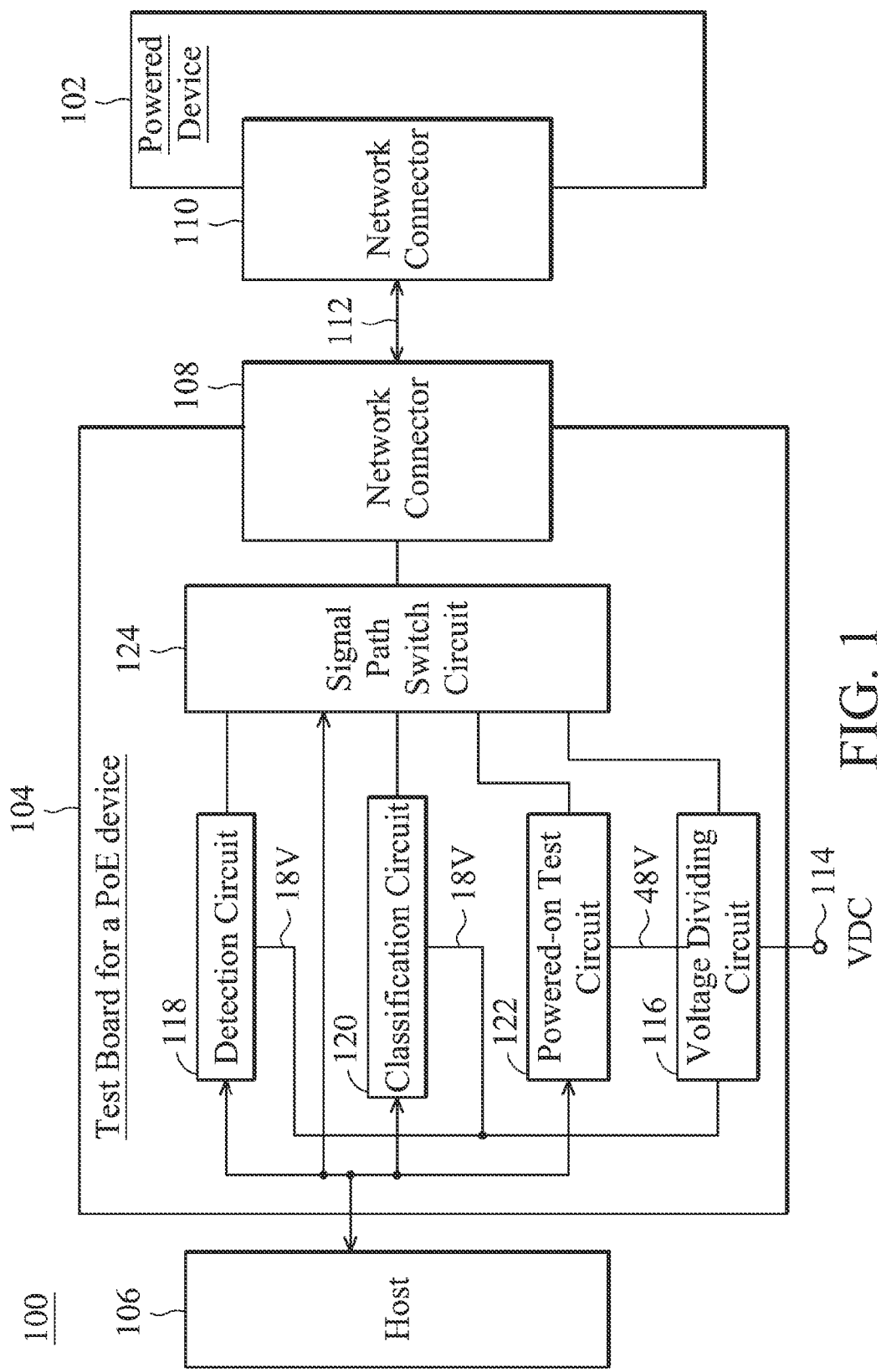
FIG. 1 depicts a test system 100 for a PoE device in accordance with an exemplary embodiment of the disclosure.

FIG. 1 depicts a test system 100 for a PoE device in accordance with an exemplary embodiment of the disclosure, which comprises a powered device 102, a test board 104 for the powered device 102 and a host 106. The test board 104 and the powered device 102 have a network connector 108 and a network connector 110, respectively. The network connector 108 and network connector 110 are coupled to each other through a network cable 112. The network connectors 108 and 110 may be RJ-45 connectors. The host 106 controls the circuit blocks on the test board 104 to test the powered device 102 through the network connection built by 108, 112 and 110.

In addition to the network connector 108, the test board 104 may further have a DC power input terminal 114, a voltage dividing circuit 116, a detection circuit 118, a classification circuit 120, a powered-on test circuit 122 and a signal path switch circuit 124.

The DC power input terminal 114 is connected to a DC power supply VDC. A voltage level supported by the DC power supply VDC may be processed by the voltage dividing circuit 116 before being offered to the circuit blocks on the test board 104. As shown, voltages originating from the DC power supply VDC are: a first DC voltage (18 volts) for the detection circuit 118 and the classification circuit 120; and a second DC voltage (48 volts) for the powered-on test circuit 122.

The signal path switch circuit 124, coupling the detection circuit 118, the classification circuit 120 and the powered-on test circuit 122 to the network connector 108, sets which one of a plurality of signal paths provided by the network connector 108 is connected with the detection circuit 118, the classification circuit 120 and the powered-on test circuit 122. Table 1 lists four signal paths of a RJ-45 network connector.

TABLE 1

| Pin No. | 1st Path | 2nd Path | 3rd Path | 4th Path |
|---|---|---|---|---|
| 1 | Non-Inverted Terminal | Inverted Terminal | | |
| 2 | Non-Inverted Terminal | Inverted Terminal | | |
| 3 | Inverted Terminal | Non-Inverted Terminal | | |
| 4 | | | Non-Inverted Terminal | Inverted Terminal |
| 5 | | | Non-Inverted Terminal | Inverted Terminal |
| 6 | Inverted Terminal | Non-Inverted Terminal | | |
| 7 | | | Inverted Terminal | Non-Inverted Terminal |
| 8 | | | Inverted Terminal | Non-Inverted Terminal |

By switching the signal path switch circuit 124, the signal paths provided by the network connector 108 may be individually tested by the detection circuit 118, the classification circuit 120 and the powered-on test circuit 122.

The detection circuit 118, the classification circuit 120 and the powered-on test circuit 122 are discussed in the following paragraphs.

The detection circuit 118 is controlled by the host 106 and is coupled to the network connector 108 through the signal path switch circuit 124. Further, the detection circuit 118 has a first power terminal coupled to receive a first DC voltage (18V) originating from the DC power supply VDC. During different time stages, the detection circuit 118 provides different impedances between the first power terminal (which is coupled to receive the first DC voltage 18V) and the network connector 108. In this manner, voltage variation at a test terminal which the network connector 108 is coupled to is used in verifying a connection between the network connector 108 and the powered device 102.

Figure 2:
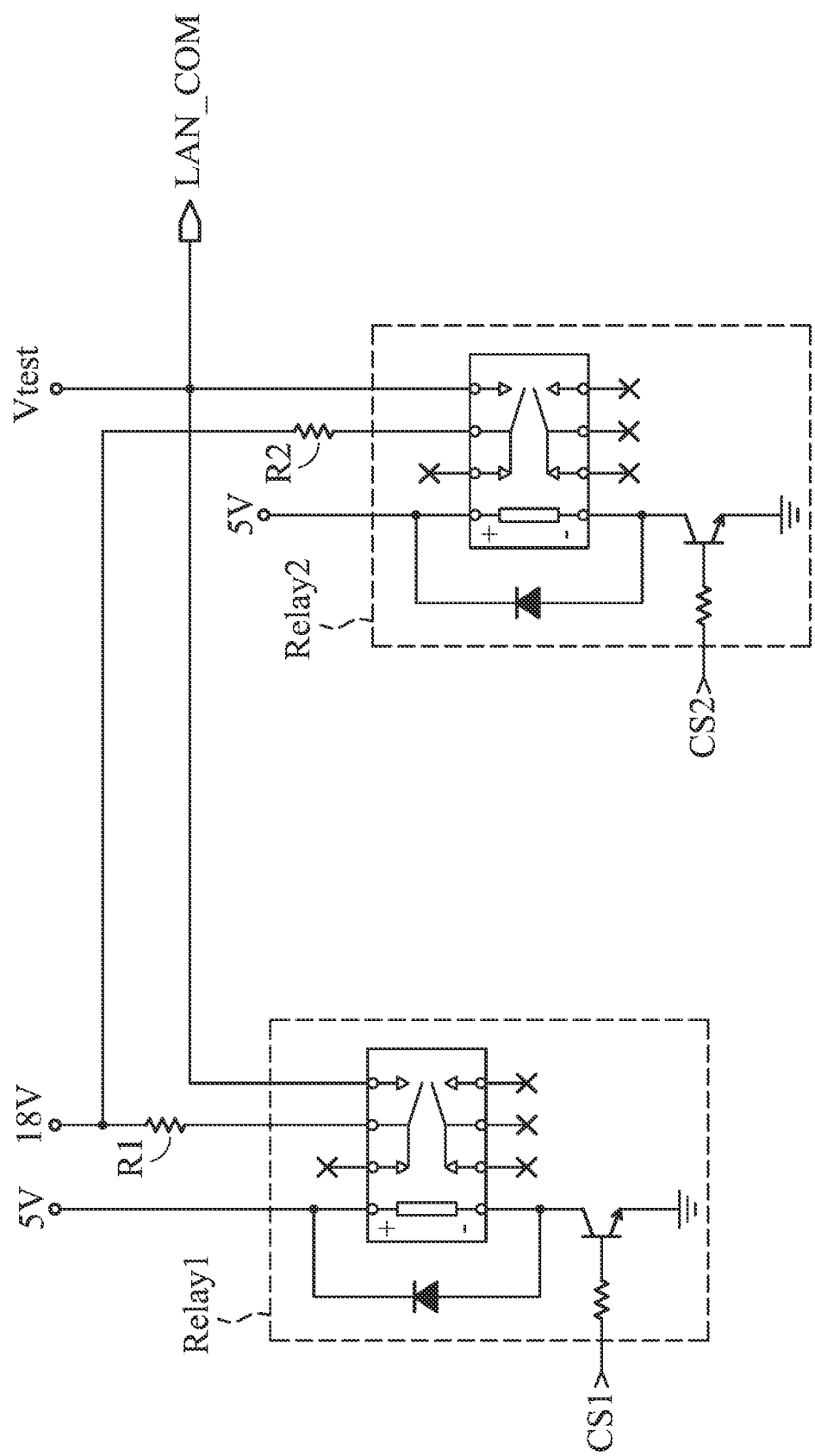
FIG. 2 depicts an exemplary embodiment of the detection circuit 118.

FIG. 2 depicts an exemplary embodiment of the detection circuit 118, which is controlled by a first control signal CS1 and a second control signal CS2. The first and second control signals CS1 and CS2 may be provided by the host 106, and the enable states of the two different control signals CS1 and CS2 are staggered from each other. The detection circuit 118 uses a first power terminal to receive the first DC voltage (18V) originating from the DC power supply VDC, and uses a first output terminal (node LAN_COM) to couple to the signal path switch circuit 124 for connecting to the network connector 108. The detection circuit 118 has a first resistor R1, a second resistor R2, a first relay circuit Relay1 and a second relay circuit Relay2. The first resistor R1 has a first terminal coupled to the first power terminal and thereby has a voltage level at the first DC voltage 18V. A second terminal of the first resistor R1 is coupled to the first relay circuit Relay1. The first relay circuit Relay1 couples the second terminal of the first resistor R1 to the first output terminal (node LAN_COM) when the first control signal CS1 is enabled. In this case, a test voltage Vtest at a test terminal coupled to the first output terminal (node LAN_COM) is at a first voltage level. The second resistor R2 has a first terminal coupled to the first power terminal and at the first DC voltage 18V. The second resistor R2 further has a second terminal coupled to the second relay circuit Relay2. The second relay circuit Relay2 couples the second terminal of the second resistor R2 to the first output terminal (node LAN_COM) when the second control signal CS2 is enabled. In this case, the test voltage Vtest at the test terminal is at a second voltage level. A voltage difference between the first and second voltage levels is used in verifying a connection between the network connector 108 and the powered device 102.

In a case wherein RJ-45 connectors are utilized, the resistance of the first resistor R1 may be designed to be 100K ohms and the resistance of the second resistor R2 may be designed to be 50K ohms. When the first DC voltage is 18 volts, it is determined that a connection is actually built between the network connector 108 and the powered device 102 once the voltage difference between the first and second voltage levels is about 2.4 volts. The first and second relay circuits Relay1 and Relay2 are provided to switch signal paths of high-voltage signals by low-voltage control signals.

The classification circuit 120 is controlled by the host 106, and is enabled after the detection circuit 118 detects the powered device 102. The classification circuit 120 is coupled to the network connector 108 through the signal path switch circuit 124, and has a second power terminal receiving the first DC voltage (18 volts) originating from the DC power supply VDC. During a classification stage, the classification circuit 120 generates a first current path between the second power terminal (which receives the first DC voltage 18V) and the network connector 108. A current flowing through the first current path shows a classified result of the powered device 102 coupled to the network connector 108.

Figure 3:
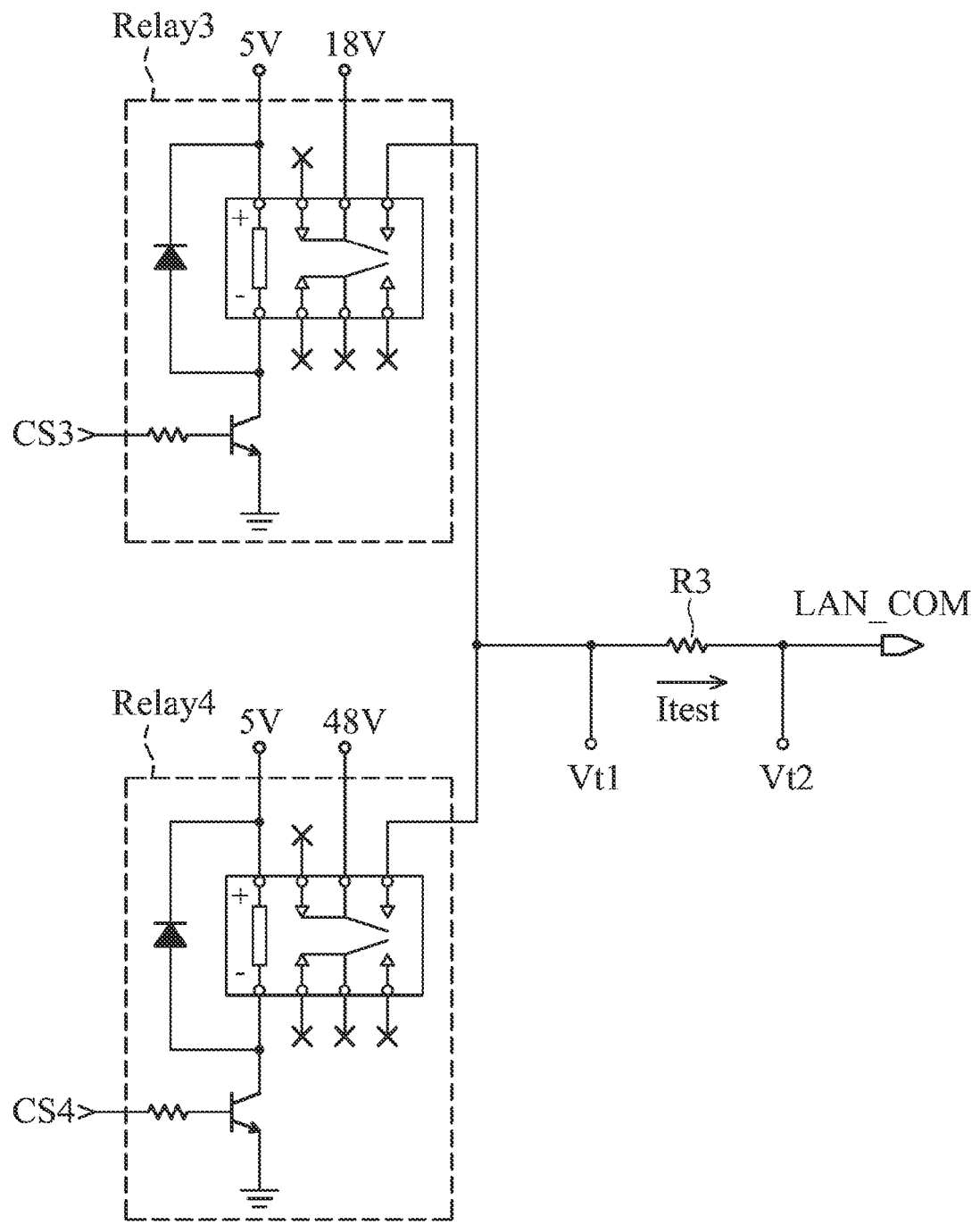
FIG. 3 depicts exemplary embodiments of the classification circuit 120 and the powered-on test circuit 122.

FIG. 3 depicts an exemplary embodiment of the classification circuit 120, which comprises a third relay circuit Relay3 and a third resistor R3 and is controlled by a third control signal CS3. The third control signal CS3 may be provided by the host 106, and the enable state of the third control signal CS3 is staggered from those of the first and second control signals CS1 and CS2. The disclosed classification circuit uses the second power terminal to receive the first DC voltage (18V) originating from the DC power supply VDC, and uses a second output terminal (node LAN_COM) to couple to the signal path switch circuit 124 for coupling to the network connector 108. The third resistor R3 has a first terminal (at a voltage level Vt1) and a second terminal (at a voltage level Vt2). The second terminal of the third resistor R3 is connected to the second output terminal (node LAN_COM). When the third control signal CS3 is enabled, the third relay circuit Relay3 couples the second power terminal (which receives the first DC voltage 18V) to the first terminal of the third resistor R3. In this manner, a current Itest flowing through the third resistor R3 is at a first current value, which may be calculated by a calculation (Vt1−Vt2)/R3 and shows the classified result of the powered device 102 that is connected to the network connector 108.

In a case wherein RJ-45 connectors are utilized, the resistance of the third resistor R3 may be designed to be 100 ohms. When the first DC voltage is 18 volts, the classification of the powered device 102 may be as shown in Table 2.

TABLE 2

| Classification | Current Range of the First Current |
| --- | --- |
| $1^{st}$ class | 0~4 mA |
| $2^{nd}$ class | 9~12 mA |
| $3^{rd}$ class | 17~20 mA |
| $4^{th}$ class | 26~30 mA |
| $5^{th}$ class | 36~44 mA |

The third relay circuit Relay3 is designed to allow a low-voltage control signal to switch the signal paths of high-voltage signals.

For an 802.3af standard, the test of the first current may be tested just one time when recognizing the classification of the powered device 102. For an 802.3at standard, the third control signal CS3 is enabled twice in an interval of 12 ms to double check the first current when recognizing the classification of the powered device 102.

The powered-on test circuit 122 is controlled by the host 106, and is enabled after the classification circuit 120 recognizes the classification of the powered device 102. The powered-on test circuit 122 is coupled to the network connector 108 through the signal path switch circuit 124 and has a third power terminal receiving the second DC voltage (48 volts) originating from the DC power supply VDC. During a powered-on test stage, the powered-on test circuit 122 builds a second current path between the third power terminal (receiving the 48 volts DC voltage) and the network connector 108. A current flowing through the second current path shows the power consumption of the powered device 102 connected at the network connector 108.

FIG. 3 further shows a fourth relay circuit Relay4, which forms an exemplary embodiment of the powered-on test circuit 122 with the third resistor R3 and is controlled by a fourth control signal CS4. The fourth control signal CS4 may be provided by the host 106. The enable state of the fourth control signal CS4 is staggered from the enable states of the first, second and third control signals CS1, CS2 and CS3. As shown, the powered-on test circuit uses the third power terminal to receive the second DC voltage (48V) and, when the fourth control signal CS4 is enabled, the fourth relay circuit Relay4 couples the third power terminal (receiving the 48V DC voltage) to the first terminal (at voltage level Vt1) of the third resistor R3. In this manner, the current Itest flowing through the third resistor R3 is considered as a second current, which may be calculated by a calculation (Vt1−Vt2)/R3 and shows the power consumption of the powered-on device 102 connected to the network connector 108.

In a case wherein RJ-45 connectors are utilized, the second DC voltage may be designed to be 48V. The fourth relay circuit Relay4 is designed to allow a low-voltage control signal to switch signal paths of high-voltage signals.

Figure 4:
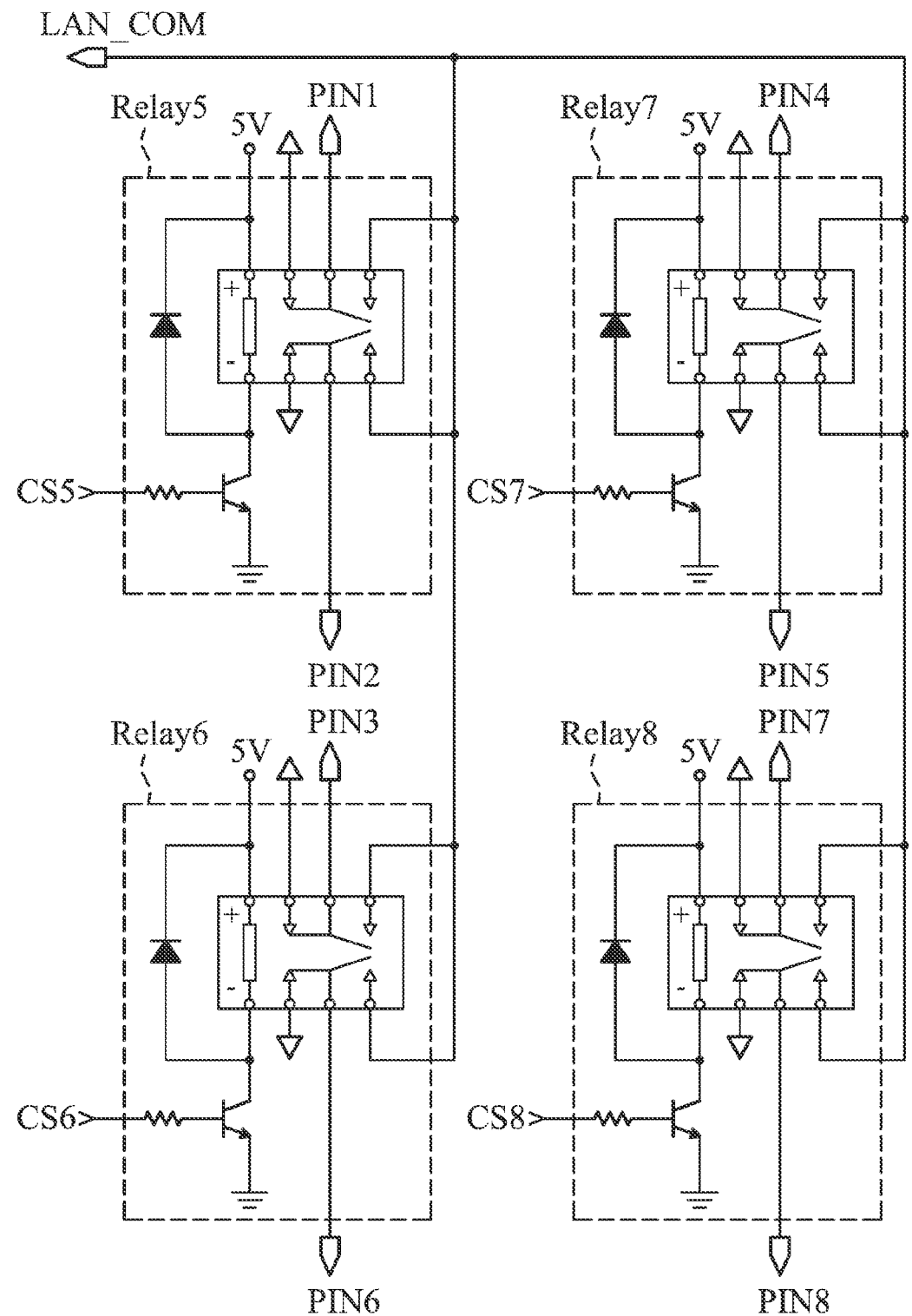
FIG. 4 depicts an exemplary embodiment of the signal path switch circuit 124.

FIG. 4 depicts an exemplary embodiment of the signal path switch circuit 124, which comprises fifth, sixth, seventh and eighth relay circuits Relay5, Relay6, Relay7 and Relay8, controlled by fifth, sixth, seventh and eighth control signals CS5, CS6, CS7 and CS8, respectively. The fifth, sixth, seventh and eighth control signals CS5, CS6, CS7 and CS8 may be provided by the host 106 and have enable states which are staggered from each other. The signal path switch circuit 124 couples the detection circuit 118, the classification circuit 120 and the powered-on test circuit 122 to one of the plurality of signal paths provided by the network connector 108 through the node LAN_COM.

In the following, an example using the RJ-45 communication technology is discussed. The enabled fifth relay circuit Relay5 couples the detection circuit 118, the classification circuit 120 and the powered-on test circuit 122 to the first and second pins (PIN1 and PIN2) of the network connector 108 to verify the first signal path of the network connector 108. The enabled sixth relay circuit Relay6 couples the detection circuit 118, classification circuit 120 and the powered-on test circuit 122 to the third and the sixth pins (PIN3 and PIN6) of the network connector 108, to verify the second signal path of the network connector 108. The enabled seventh relay circuit Relay7 couples the detection circuit 118, classification circuit 120 and powered-on test circuit 122 to the fourth and fifth pins (PIN4 and PIN5) of the network connector 108 to verify the third signal path of the network connector 108. The enabled eighth relay circuit Relay8 couples the detection circuit 118, the classification circuit 120 and the powered-on test circuit 122 to the seventh and eighth pins (PIN7 and PIN8) of the network connector 108 to verify the fourth signal path of the network connector 108. The relay circuits Relay5 to Relay8 are designed to allow the low-voltage control signals to switch the signal paths of the high-voltage signals.

Figure 5:
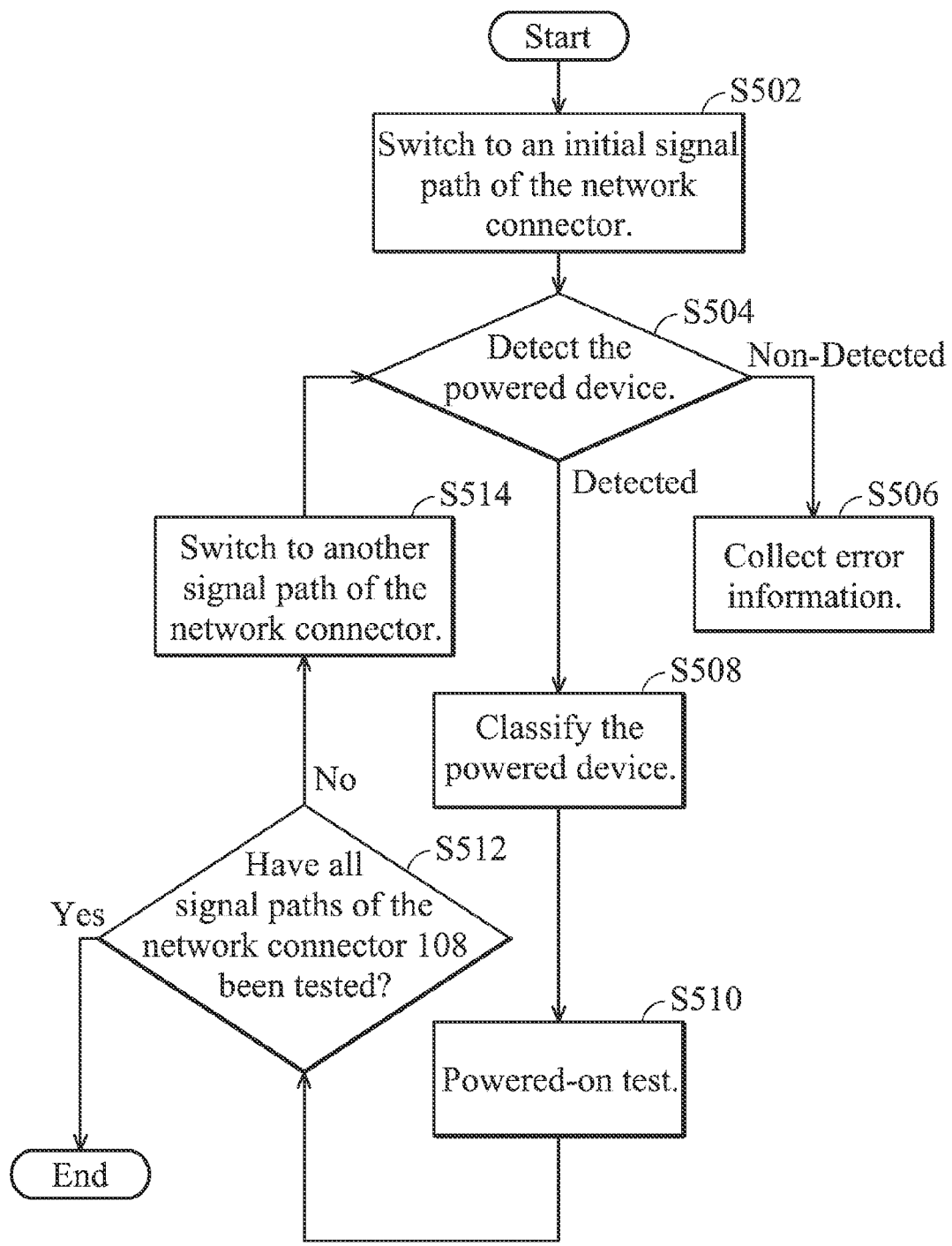
FIG. 5 is a flowchart depicting a test method for a PoE device in accordance with an exemplary embodiment of the disclosure.

FIG. 5 is a flowchart depicting a test method for a PoE device in accordance with an exemplary embodiment of the disclosure, wherein the aforementioned test board 104 is utilized and the test board 104 is connected with the powered device 102. In step S502, the signal path switch circuit 124 is switched to couple to an initial signal path of the network connector 108. In step S504, the detection circuit 118 is enabled to detect the powered device 102. When the powered device 102 is not detected, step S506 is performed to collect error information to be analyzed by the host 106. When the powered device 102 is correctly detected in step S504, the step S508 is performed to enable the classification circuit 120 to classify the powered device 102. Then, the step S510 is performed to enable the powered-on test circuit 122 to test the power consumption of the powered device 102. In step S512, it is determined whether all signal paths of the network connector 108 have been tested. When all signal paths have been tested, the procedure is ended. When any signal path has not been tested, the step S514 is performed and the signal path switch circuit 124 is switched to couple to another signal path of the network connector 108. Then, the step S504 is repeated to test the new signal path.

Figure 6:
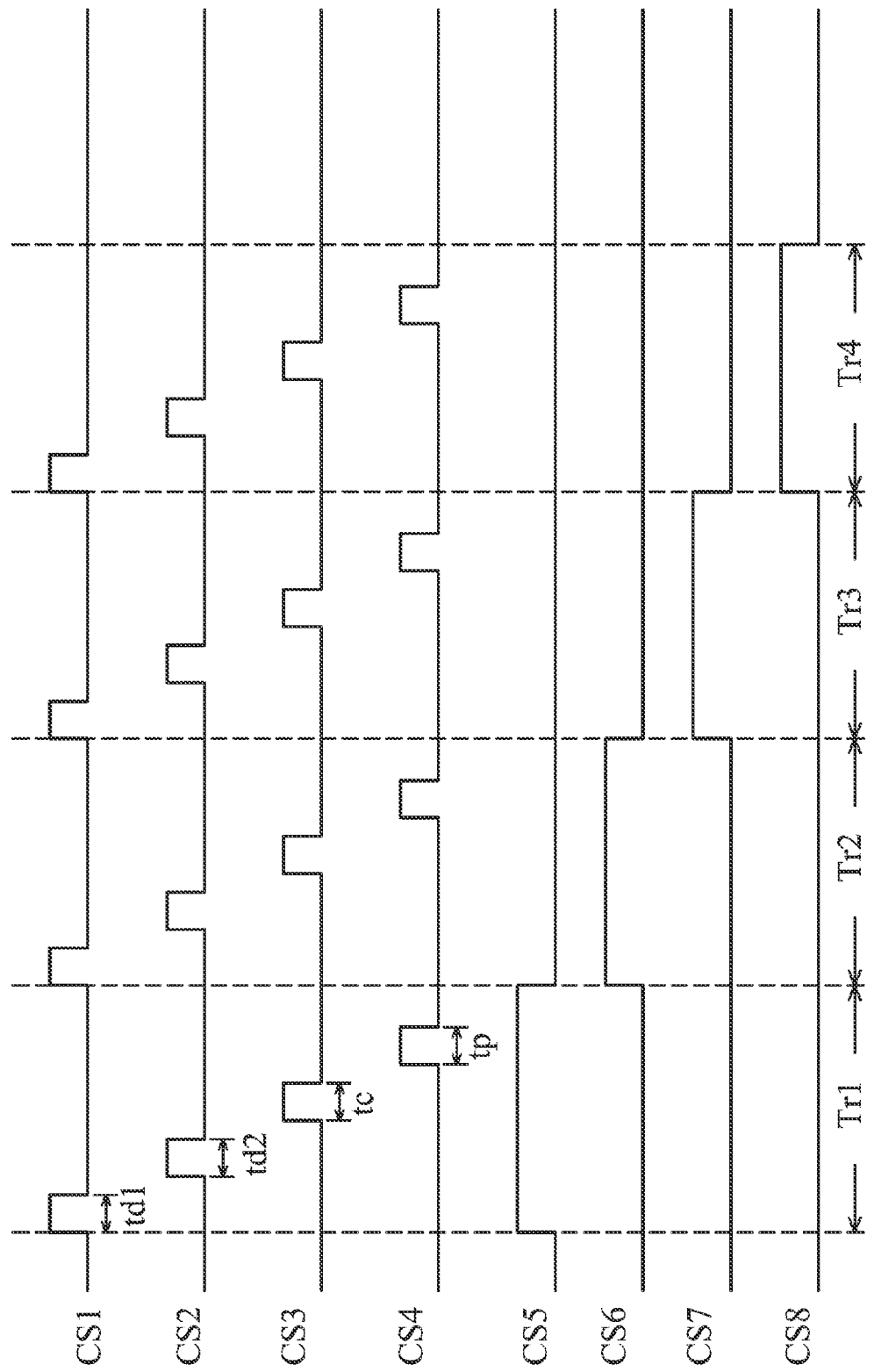
FIG. 6 shows timing diagrams of the first to the eighth control signals CS1 to CS8 in accordance with an exemplary embodiment of the disclosure.

FIG. 6 shows timing diagrams depicting the first to the eighth control signals CS1 to CS8 in accordance with an exemplary embodiment of the disclosure. The fifth to eighth control signals CS5 to CS8 are enabled in time intervals Tr1 to Tr4, respectively, and thereby the first to the fourth signal paths of the network connector (e.g. RJ-45 connector) are tested in turn. The first and second control signals CS1 and CS2 are enabled in time intervals td1 and td2, respectively, to control the detection circuit 118. The third control signal CS is enabled during a classification stage tc, to operate the classification circuit 120. The fourth control signal CS4 is enabled during a powered-on test stage tp, to operate the powered-on test circuit 122.

Note that the embodiments shown in FIG. 2 to FIG. 4 are not intended to limit the design of the circuit blocks. The first and second DC voltages may be adjusted if necessary, and are not limited to 18V and 48V, respectively. The resistances of the first, second, third resistors R1, R2 and R3 depend on the actual circuit design, and are not limited to 100K, 50K and 100 ohms, respectively. Further, the circuit blocks on the test board 104 of FIG. 1 may be modified depending on user needs. Some of the circuit blocks are optional.

While the disclosure has been described by way of example and in terms of the preferred embodiments, it is to be understood that the disclosure is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A test board for a Power over Ethernet device, comprising:
   a DC power input terminal for connection to a DC power supply;
   a network connector;
   a detection circuit, controlled by a first control signal and a second control signal and having:
   a first power terminal, receiving a first DC voltage originating from the DC power supply;
   a first output terminal coupled to the network connector;
   a first resistor, coupling the first power terminal to the first output terminal when the first control signal is enabled to present a first voltage level at the first output terminal; and
   a second resistor having a resistance different from that of the first resistor, wherein when the second control signal is enabled, the second resistor couples the first power terminal to the first output terminal and thereby the first output terminal is at a second voltage level,
   wherein a voltage difference between the first and second voltage levels shows whether a powered device is connected to the network connector; and
   a classification circuit controlled by a third control signal and having:
   a second power terminal receiving the first DC voltage;
   a second output terminal coupled to the network connector; and
   a third resistor, wherein when the third control signal is enabled, the third resistor couples the second power terminal to the second output terminal and thereby a first current flows through the third resistor;
   wherein the first current shows a classified result of the powered device which is connected to the network connector.

2. The test board as claimed in claim 1, wherein:
   the first resistor has a first terminal and a second terminal, and the first terminal of the first resistor is connected to the first power terminal;
   the second resistor has a first terminal and a second terminal, and the first terminal of the second resistor is connected to the first power terminal; and
   the detection circuit further comprises:
   a first relay circuit, coupling the second terminal of the first resistor to the first output terminal based on the first control signal; and
   a second relay circuit, coupling the second terminal of the second resistor to the first output terminal based on the second control signal.

3. The test board as claimed in claim 2, wherein:
   the third resistor has a first terminal and a second terminal, and the second terminal of the third resistor is coupled to the second output terminal; and
   the classification circuit further comprises:
   a third relay circuit, coupling the second power terminal to the first terminal of the third resistor based on the third control signal.

4. The test board as claimed in claim 3, further comprising:
   a powered-on test circuit controlled by a fourth control signal, comprising:
   a third power terminal receiving a second DC voltage originating from the DC power supply; and
   a fourth relay circuit coupling the third power terminal to the first terminal of the third resistor based on the fourth control signal to drive a second current to flow through the third resistor,
   wherein the second current shows power consumption of the powered device which is connected to the network connector.

5. The test board as claimed in claim 4, further comprising:
   a signal path switch circuit, controlling one of a plurality of signal paths provided by the network connector to couple to the first output terminal and the second output terminal.

6. A test system for a Power over Ethernet device, comprising:
   a test board; and
   a host controlling the test board,
   wherein the test board comprises:
   a DC power input terminal for connection to a DC power supply;
   a network connector;
   a detection circuit, controlled by a first control signal and a second control signal and having:
   a first power terminal, receiving a first DC voltage originating from the DC power supply;
   a first output terminal coupled to the network connector;
   a first resistor, coupling the first power terminal to the first output terminal when the first control signal is enabled to present a first voltage level at the first output terminal; and
   a second resistor having a resistance different from that of the first resistor, wherein when the second control signal is enabled, the second resistor couples the first power terminal to the first output terminal and thereby the first output terminal is at a second voltage level,
   wherein a voltage difference between the first and second voltage levels shows whether a powered device is connected to the network connector; and
   a classification circuit controlled by a third control signal and having:
   a second power terminal receiving the first DC voltage;
   a second output terminal coupled to the network connector; and
   a third resistor, wherein when the third control signal is enabled, the third resistor couples the second power terminal to the second output terminal and thereby a first current flows through the third resistor;

wherein the first current shows a classified result of the powered device which is connected to the network connector.

7. A test method for a Power over Ethernet device, comprising:

providing a test board for a Power over Ethernet device, wherein the test board has a first resistor, a second resistor, a third resistor, a DC power terminal connected to a DC power supply, and a network connector connected to a powered device;

during a first detection stage, using one end of the first resistor to receive a first DC voltage originating from a DC power supply and coupling the other end of the first resistor to the network connector to obtain a first voltage level from a test terminal which is coupled to the network connector;

during a second detection stage, using one end of the second resistor to receive the first DC voltage and coupling the other end of the second resistor to the network connector to obtain a second voltage level at the test terminal;

verifying a connection between the powered device and the network connector based on a voltage difference between the first and second voltage levels;

arranging a classification stage after detecting the connection between the powered device and the network connector, wherein, during the classification stage, one end of the third resistor receives the first DC voltage and the other end of the third resistor is coupled to the network connector and thereby a first current flows through the third resistor; and classifying the powered device based on the first current.

8. The test method as claimed in claim 7, further comprising:

arranging a powered-on test stage after obtaining a classified result of the powered device;

during the powered-on test stage, one end of the third resistor receives a second voltage originating from the DC power supply and the other end of the third resistor is coupled to the network connector and thereby a second current flows through the third resistor; and analyzing power consumption of the powered device based on the second current.

9. The test method as claimed in claim 8, further comprising:

switching between a plurality of signal paths provided by the network connector to test the connection between the powered device and the network connector and to obtain the classified result and the power consumption of the powered device via each signal path.

* * * * *